(12) United States Patent
Okubo et al.

(10) Patent No.: US 10,005,121 B2
(45) Date of Patent: Jun. 26, 2018

(54) APPARATUS FOR FORMING A BLANK FOR FINISH FORGING FOR A FORGED CRANKSHAFT FOR A 4-CYLINDER ENGINE, AND METHOD FOR MANUFACTURING A FORGED CRANKSHAFT FOR A 4-CYLINDER ENGINE USING THE SAME

(71) Applicant: NIPPON STEEL & SUMITOMO METAL CORPORATION, Tokyo (JP)

(72) Inventors: Junichi Okubo, Amagasaki (JP); Kenji Tamura, Takatsuki (JP); Kunihiro Yoshida, Nishinomiya (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 129 days.

(21) Appl. No.: 15/118,127

(22) PCT Filed: Feb. 18, 2015

(86) PCT No.: PCT/JP2015/000735
§ 371 (c)(1),
(2) Date: Aug. 11, 2016

(87) PCT Pub. No.: WO2015/129201
PCT Pub. Date: Sep. 3, 2015

(65) Prior Publication Data
US 2017/0173663 A1    Jun. 22, 2017

(30) Foreign Application Priority Data

Feb. 27, 2014    (JP) ................................. 2014-036731

(51) Int. Cl.
*B21K 1/08*    (2006.01)
*B21J 1/04*    (2006.01)
(Continued)

(52) U.S. Cl.
CPC ................... *B21K 1/08* (2013.01); *B21J 1/04* (2013.01); *B21J 1/06* (2013.01); *F16C 3/08* (2013.01);
(Continued)

(58) Field of Classification Search
CPC .... B21K 1/08; B21K 1/00; B21J 5/025; B21J 1/06; B21J 1/04; F16C 3/08; F16C 3/06; F16C 2220/46; F02B 2075/027
See application file for complete search history.

(56) References Cited

U.S. PATENT DOCUMENTS 4,646,551 A    3/1987 Rut

FOREIGN PATENT DOCUMENTS

| CN | 101959627 | 1/2011 |
| CN | 102451876 | 5/2012 |

(Continued)

*Primary Examiner* — Moshe Wilensky
(74) *Attorney, Agent, or Firm* — Clark & Brody

(57) ABSTRACT

In a forming apparatus, stationary journal dies (10U, 10B) and movable journal dies (11U, 11B) each hold and retain rough journal portions (Ja) of a preform blank (4) therebetween, and crank pin dies (12) contacts rough crank pin portions (Pa) thereof, and in this state, the movable journal dies (11U, 11B) are moved axially toward the stationary journal dies (10U, 10B) and the crank pin dies (12) are moved in the same axial direction and in an eccentric direction. With this, weighted rough arm portions (Aa) are axially compressed to reduce their thickness to that of weighted arms of a forged crankshaft, and the rough crank pin portions (Pa) are pressed in the eccentric direction to increase the amount of eccentricity to that of the crank pins of the forged crankshaft.

9 Claims, 12 Drawing Sheets

(51) Int. Cl.
*B21J 1/06* (2006.01)
*F16C 3/08* (2006.01)
B21K 1/00 (2006.01)
F02B 75/02 (2006.01)
F16C 3/06 (2006.01)

(52) U.S. Cl.
CPC ........... *B21K 1/00* (2013.01); *F02B 2075/027* (2013.01); *F16C 3/06* (2013.01)

(56) References Cited

FOREIGN PATENT DOCUMENTS

| | | |
|---|---|---|
| CN | 102548684 | 7/2012 |
| JP | 2008-155275 | 7/2008 |
| JP | 2011-161496 | 8/2011 |
| JP | 2012-161819 | 8/2012 |

FIG. 2
PREFORM BLANK
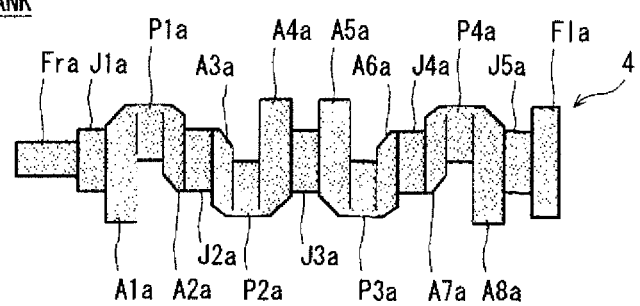
⬇ FORMING
BLANK FOR FINISH FORMING
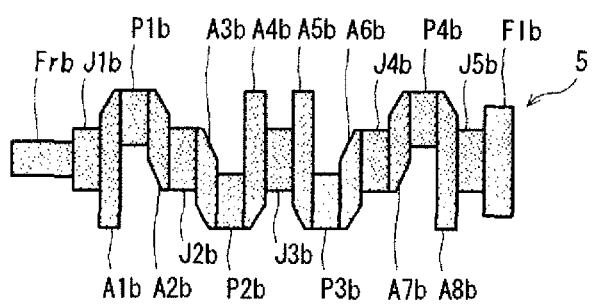

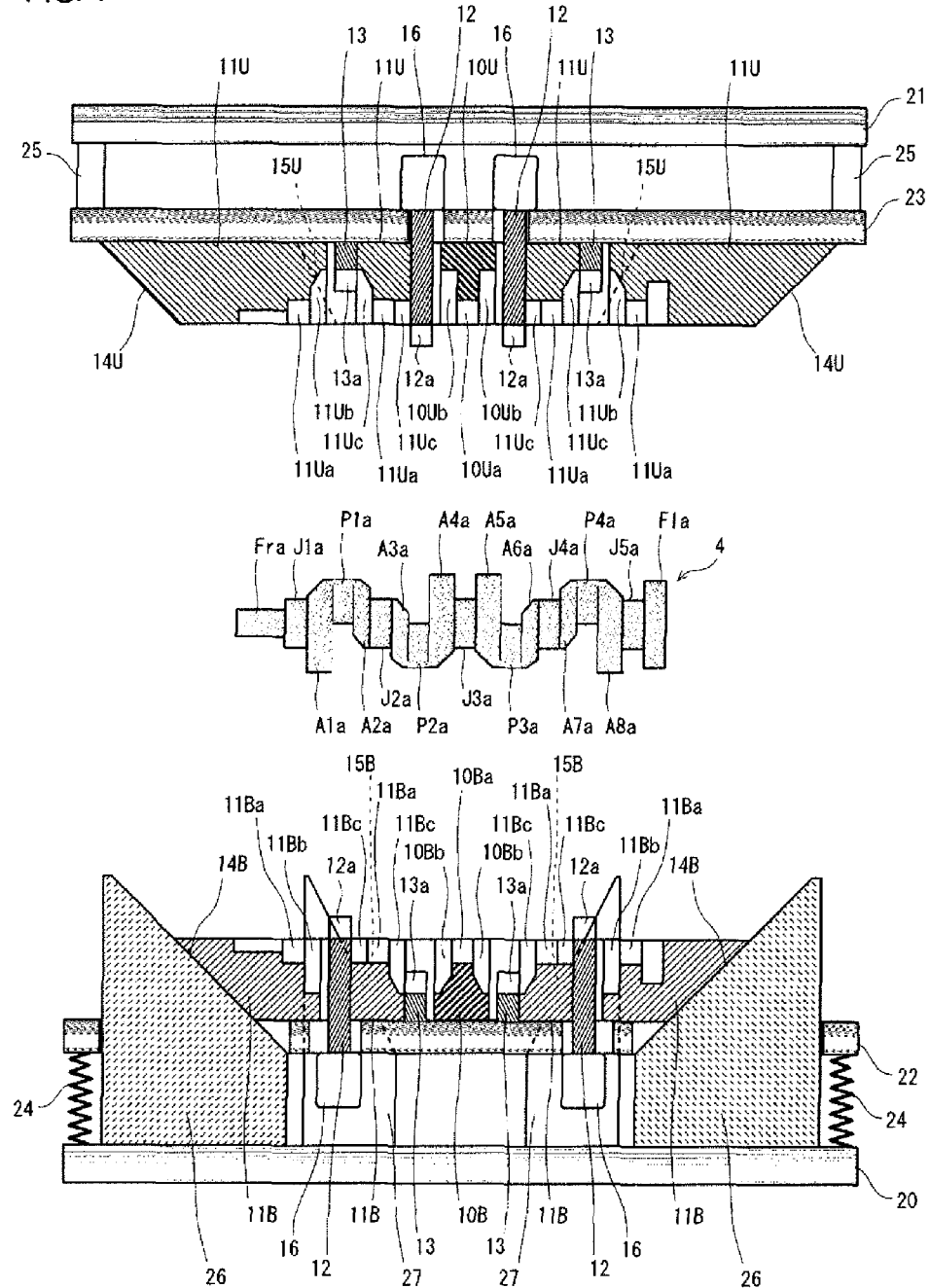

FIG. 8
PREFORM BLANK
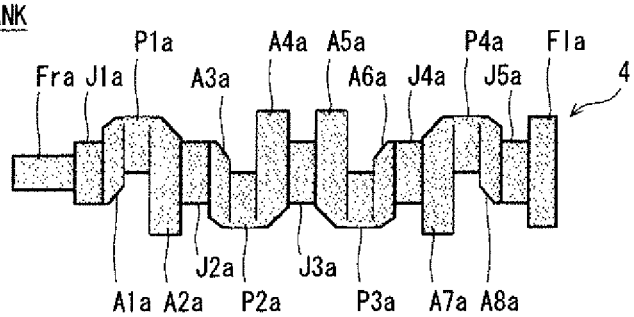
⇩ FORMING
BLANK FOR FINISH FORMING
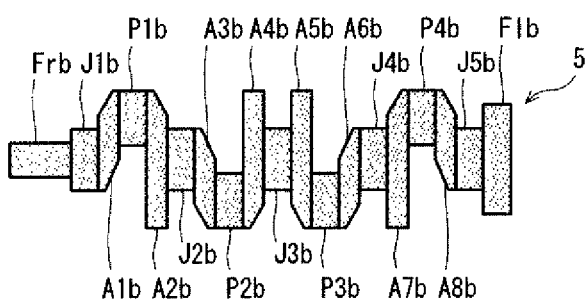

APPARATUS FOR FORMING A BLANK FOR FINISH FORGING FOR A FORGED CRANKSHAFT FOR A 4-CYLINDER ENGINE, AND METHOD FOR MANUFACTURING A FORGED CRANKSHAFT FOR A 4-CYLINDER ENGINE USING THE SAME

TECHNICAL FIELD

The present invention relates to techniques for manufacturing, by hot forging, a crankshaft (hereinafter also referred to as a "forged crankshaft") for a 4-cylinder engine. In particular, the present invention relates to an apparatus for forming, in a process of manufacturing a forged crankshaft, a blank for finish forging to be subjected to finish forging by which the final shape of the forged crankshaft is obtained, and relates to a method for manufacturing a forged crankshaft for a 4-cylinder engine including a preforming step using the forming apparatus.

BACKGROUND ART

A crankshaft is a principal component of a reciprocating engine, which power is extracted by converting reciprocating motion of pistons to rotary motion. Generally, there are two types of crankshafts: those that are manufactured by forging and those that are manufactured by casting. For 4-cylinder engines for automobiles such as passenger cars, freight cars, and specialized work vehicles, it is necessary that their crankshafts have high strength and stiffness, and therefore forged crankshaft, which are more capable of meeting the need, are widely used. For 4-cylinder engines of motorcycles, agricultural machines, marine vessels, and the like, forged crankshafts are also used.

In general, forged crankshafts for 4-cylinder engines are manufactured by using, as a starting material, a billet, and subjecting the billet to the steps of preforming, die forging, trimming and coining in order. The billet has a circular or square cross section and has a constant cross-sectional area along the overall length. The preforming step includes roll forming and bending, and the die forging step includes block forging and finish forging.

FIG. 1 is a schematic diagram illustrating a typical conventional process for manufacturing a forged crankshaft for 4-cylinder engines. A crankshaft 1 illustrated in FIG. 1 is intended to be mounted in a 4-cylinder engine. It is a 4-cylinder 8-counterweight crankshaft that includes: five journals J1 to J5; four crank pins P1 to P4; a front part Fr, a flange Fl, and eight crank arms (hereinafter referred to as "crank arms") A1 to A8 that connect the journals J1 to J5 and the crank pins P1 to P4 to each other. This crankshaft 1 is a 4-cylinder 4-counterweight crankshaft. Among the eight arms A1 to A8, the first and eighth arms A1, A8 at opposite ends, and the fourth and fifth crank arms A4, A5 connecting with a central third journal have balance weights. The second, third, sixth, and seventh arms A2, A3, A6, and A7 have no balance weights, therefore having an oval shape. Hereinafter, when the journals J1 to J5, the crank pins P1 to P4, and the crank arms A1 to A8 are each collectively referred to, a reference character "J" is used for the journals, a reference character "P" for the crank pins, and a reference character "A" for the crank arms. An arm having a balance weight is also referred to as a weighted arm when distinguished from an arm having no balance weight. On the other hand, an arm having no balance weight is also referred to as a non-weighted arm or an oval arm.

According to the manufacturing method shown in FIG. 1, the forged crankshaft 1 is manufactured in the following manner. Firstly, a billet 2 shown in FIG. 1(a), which has been previously cut to a predetermined length, is heated by a heating furnace and then is subjected to roll forming. In the roll forming step, the billet 2 is rolled and reduced in cross section by grooved rolls, for example, to distribute its volume in the longitudinal direction, whereby a rolled blank 103, which is an intermediate material, is formed (see FIG. 1(b)). In the bending step, the rolled blank 103 obtained by roll forming is partially pressed in a press in a direction perpendicular to the longitudinal direction to distribute its volume, whereby a bent blank 104, which is a secondary intermediate material, is formed (see FIG. 1(c)).

Then, in the block forging step, the bent blank 104 obtained by bending is press forged with a pair of upper and lower dies, whereby a forged blank 105 having a general shape of a crankshaft (forged final product) is formed (see FIG. 1(d)). Then, in the finish forging step, the block forged blank 105 obtained by block forging is further processed by press forging the block forged blank 105 with a pair of upper and lower dies, whereby a forged blank 106 having a shape in agreement with the shape of the crankshaft is formed (see FIG. 1(e)). In the block forging and the finish forging, excess material flows out as a flash from between the parting surfaces of the dies that oppose each other. Thus, the block forged blank 105 and the finish forged blank 106 have large flashes 105a, 106a, respectively, around the formed shape of the crankshaft.

In the trimming step, the finish forged blank 106 with the flash 106a, obtained by finish forging, is held by dies from above and below and the flash 106a is trimmed by a cutting die. In this manner, the forged crankshaft 1 is obtained as shown in FIG. 1(f). In the coining step, principal parts of the forged crankshaft 1, from which the flash has been removed, e.g., shaft parts such as the journals J, the crank pins P, the front part Fr, and the flange Fl, and in some cases the crank arms A, are slightly pressed with dies from above and below and formed into a desired size and shape. In this manner, the forged crankshaft 1 is manufactured.

The manufacturing process shown in FIG. 1 is applicable not only to a 4-cylinder 4-counterweight crankshaft as exemplified, but also to other 4-cylinder 4-counterweight crankshaft. In another type of 4-cylinder 4-counterweight crankshaft, among the eight arms A, in place of the leading first arm A1 connecting with a first pin P1 at the fore end, the second arm A2 connecting with the same first pin P1 has a balance weight. In this crankshaft, in place of the trailing eighth arm A8 connecting with the fourth pin P4 at the rear end, the seventh arm A7 connecting with the same fourth pin P4 has a balance weight.

With such a manufacturing method, it is inevitable that material utilization decreases because large amounts of unnecessary flash, which is not a part of the end product, are generated. Thus, in the manufacturing of a forged crankshaft, it has so far been an important object to inhibit the generation of flash to the extent possible and achieve improvement of material utilization. Examples of conventional techniques that address this object are as follows.

For example, Japanese Patent Application Publication No. 2008-155275 (Patent Literature 1) and Japanese Patent Application Publication No. 2011-161496 (Patent Literature 2) disclosure techniques for manufacturing a crankshaft, by which journals and crank pins are shaped and crank arms are roughly shaped. In the technique Patent Literature 1, a stepped round bar having reduced diameter regions at portions to be formed into journals and crank pins of a crankshaft is a round bar used as a blank. A pair of the portions to be formed into journals, between which a portion to be formed into a crank pin is disposed, are held with dies. In this state, the opposing dies are axially moved toward each other to compressively deform the round bar blank. Concurrently with imparting this deformation, punches are pressed against the portion to be formed into a crank pin in a direction perpendicular to the axial direction, whereby the portion to be formed into a crank pin is placed into an eccentric position. The above operation is repeated in succession for all crank throws.

In a technique of Patent Literature 2, a simple round bar is used as a blank. One end of the two ends of the round bar is held with a stationary die and the other end thereof is held with a movable die, and a portion to be formed into a journal is held with journal dies and portions to be formed into crank pins with crank pin dies. In this state, the movable die, the journal dies and the crank pin dies are axially moved toward the stationary die to compressively deform the round bar blank. Concurrently with imparting this deformation, the crank pin dies are moved in an eccentric direction perpendicular to the axial direction to place the portion to be formed into the crank pin into an eccentric position.

With both the techniques of Patent Literatures 1 and 2, no flash will be generated, and therefore a significant improvement in material utilization can be expected.

CITATION LIST

Patent Literature

Patent Literature 1: Japanese Patent Application Publication No. 2008-155275
Patent Literature 2: Japanese Patent Application Publication No. 2011-161496

SUMMARY OF INVENTION

Technical Problem

As described above, according to the techniques disclosed in Patent Literatures 1 and 2, a round bar blank is directly processed into a crankshaft shape. However, blanks for a forged crankshaft are not easily deformable because forged crankshafts are required to have high strength and high stiffness. Thus, crankshafts that would be practically manufacturable are inevitably limited to such ones having crank arms of large thickness and crank pins with a small amount of eccentricity, and therefore having a relatively gentle crankshaft shape. Moreover, all the crank arms are limited to a simple shape without a balance weight, i.e., an oval arm.

In addition, according to the techniques disclosed in Patent Literatures 1 and 2, the shape of crank arms is formed by free expansion of a round bar blank in a direction perpendicular to the axial direction in conjunction with its axial compressive deformation and by tensile deformation of the round bar blank in conjunction with the movement of portions to be formed into crank pins in an eccentric direction. Because of this, the contour shape of the crank arms tend to be unstable, and thus dimensional accuracy cannot be ensured.

The present invention has been made in view of the foregoing problems. Accordingly, in order to manufacture forged crankshafts for 4-cylinder engines with high material utilization and also with high dimensional accuracy regardless of their shapes, it is an object of the present invention to provide an apparatus for use in forming a blank for finish forging to be subjected to finish forging on the premise that, in the process of manufacturing a forged crankshaft, finish forging for forming its final shape is performed. Another object of the present invention is to provide a method for manufacturing forged crankshafts for 4-cylinder engines with high material utilization and also with high dimensional accuracy regardless of their shapes.

Solution to Problem

An apparatus for forming according to an embodiment of the present invention is an apparatus for forming a blank for finish forging from a preform blank, the apparatus configured to form, in a process of manufacturing a forged crankshaft for a 4-cylinder engine, a blank for finish forging to be subjected to finish forging by which a final shape of the forged crankshaft is obtained.

In the forged crankshaft,
fourth and fifth crank arms connecting with a central third journal have balance weights,
any one of first and second crank arms connecting with a first crank pin at a fore end has a balance weight, and any one of seventh and eighth crank arms connecting with a fourth crank pin at a rear end has a balance weight, and
the remaining crank arms have no balance weights.
The preform blank includes:
rough journal portions having an axial length equal to an axial length of journals of the forged crankshaft;
rough crank pin portions having an axial length equal to an axial length of crank pins of the forged crankshaft and having a smaller amount of eccentricity in an eccentric direction perpendicular to the axial direction than an amount of eccentricity of the crank pins of the forged crankshaft; and
among the crank arms of the forged crankshaft, non-weighted rough crank arm portions corresponding to non-weighted crank arms not having the balance weights, the non-weighted rough crank arm portions having an axial thickness equal to an axial thickness of the crank arms, and weighted rough crank arm portions corresponding to weighted crank arms having the balance weights, the weighted rough crank arm portions having an axial thickness greater than an axial thickness of the crank arms.

The forming apparatus according to the present embodiment includes the following stationary journal dies, movable journal dies, and crank pin dies.

The stationary journal dies are disposed at locations corresponding to a location of the third rough journal portion, configured to hold and retain the rough journal portion therebetween in the eccentric direction perpendicular to the axial direction, and configured to be in contact with side surfaces of the rough crank arm portion connecting with the rough journal portion with axial movement thereof restrained.

The movable journal dies are disposed at locations corresponding to locations of the rough journal portions excluding the rough journal portion to be held by the stationary journal dies, the movable journal dies configured to hold and retain the rough journal portions therebetween in the eccentric direction perpendicular to the axial direction, the movable journal dies configured to move axially toward the stationary journal dies while being in contact with side surfaces of corresponding ones of the rough crank arm portions, the corresponding ones of the rough crank arm portions each connecting with a corresponding one of the rough journal portions.

Crank pin dies are disposed at locations corresponding to locations of the rough crank pin portions, the crank pin dies configured to be brought into contact with the respective rough crank pin portions at inner sides thereof, the crank pin dies configured to move axially toward the stationary journal dies and in the eccentric direction perpendicular to the axial direction while being in contact with side surfaces of corresponding ones of the rough crank arm portions, the corresponding ones of the rough crank arm portions each connecting with a corresponding one of the rough crank pin portions.

The forming apparatus moves, in a state where the rough journal portions are held and retained by the stationary journal dies and the movable journal dies and the rough crank pin portions are contacted by the crank pin dies, the movable journal dies axially, and moves the crank pin dies axially as well as in the eccentric direction. Thereby, the weighted rough crank arm portions are compressed in the axial direction so as to reduce the thickness thereof to the thickness of the crank arms of the forged crankshaft, and pressing the rough crank pin portions in the eccentric direction so as to increase the amount of eccentricity thereof to the amount of eccentricity of the crank pins of the forged crankshaft.

In the above forming apparatus, it is preferred that the crank pin dies each include an auxiliary crank pin die disposed at a location facing an outer side, opposite to the inner side, of each rough crank pin portion, the auxiliary crank pin dies configured to move axially, and preferred that the movement of the crank pin dies in the eccentric direction is controlled so that the rough crank pin portions to be eccentrically deformed reach the auxiliary crank pin dies after spaces between the stationary journal dies and the movable journal dies and corresponding ones of the crank pin dies and the auxiliary crank pin dies are filled by the axial movement of the movable journal dies as well as the axial movement of the crank pin dies and the auxiliary crank pin dies.

This forming apparatus preferably has a configuration such that, provided that a total length of movement of the crank pin dies in the eccentric direction is a 100% length of movement thereof, when the axial movement of the movable journal dies that are adjacent to the crank pin dies is completed, a length of movement of the crank pin dies in the eccentric direction is 90% or less of the total length of movement, and thereafter, the movement of the crank pin dies in the eccentric direction is completed.

Furthermore, the above forming apparatus may have a configuration such that the stationary journal dies, the movable journal dies, and the crank pin dies are mounted on a press machine that is capable of being moved downward along the eccentric direction and, by the downward movement of the press machine, the stationary journal dies and the movable journal dies are caused to hold and retain the rough journal portions therebetween while the crank pin dies are brought into contact with the rough crank pin portions; and with continued downward movement of the press machine, the movable journal dies are moved axially by wedge mechanisms, and the crank pin dies are caused to move axially by the movement of the movable journal dies.

In the case of this forming apparatus, it is preferred that the wedge mechanisms have different wedge angles for each movable journal die. Furthermore, it is preferred that the crank pin dies are coupled to a hydraulic cylinder and caused to move in the eccentric direction by driving the hydraulic cylinder.

The forming apparatus described above is applicable to manufacturing a forged crankshaft in which the first, fourth, fifth, and eighth crank arms have balance weights, and the remaining second, third, sixth, and seventh crank arms have no balance weights. The forming apparatus described above is also applicable to manufacturing a forged crankshaft in which the second, fourth, fifth, and seventh crank arms have balance weights, and the remaining first, third, sixth, and eighth crank arms have no balance weights.

A manufacturing method according to an embodiment of the present invention is a method for manufacturing the forged crankshaft described above, including a series of steps, a first preforming step, a second preforming step, and a finish forging step.

The first preforming step is of obtaining the preform blank provided for the forming apparatus described above.

The second preforming step is of forming a blank for finish forging that has the final shape of the forged crankshaft using the forming apparatus described above.

The finish forging step is of subjecting the blank for finish forging to finish forging to form a forged product having the final shape of the forged crankshaft.

Advantageous Effects of Invention

With the forming apparatus of the present invention and the manufacturing method including a preforming step using the same, it is possible to form, from a preform blank without a flash, a blank for finish forging without a flash which has a shape generally in agreement with the shape of a forged crankshaft for a 4-cylinder engine having thin crank arms even weighted arms. When such a blank for finish forging is subjected to finish forging, it is possible to obtain the final shape of a forged crankshaft including the contour shape of crank arms although some minor amount of flash is generated. Thus, forged crankshafts for 4-cylinder engines can be manufactured with high material utilization and also with high dimensional accuracy regardless of their shapes.

BRIEF DESCRIPTION OF DRAWINGS

FIG. 2 is a plan view schematically showing the shapes of a preform blank to be processed by the forming apparatus and a blank for finish forging formed therefrom, in the method for manufacturing of a first embodiment.

FIG. 4 is a longitudinal cross sectional view showing the configuration of the forming apparatus of the first embodiment.

FIG. 8 is a plan view schematically showing the shapes of a preform blank to be processed by the forming apparatus and a blank for finish forging formed therefrom, in the method for manufacturing in a second embodiment.

DESCRIPTION OF EMBODIMENTS

The present invention is based on the premise that, in manufacturing a forged crankshaft for 4-cylinder engines, finish forging is performed in the manufacturing process. The forming apparatus of the present invention is used for forming, in a step prior to finish forging, a blank for finish forging to be subjected to the finish forging, from a preform blank. With regard to the apparatus for forming a blank for finish forging for a forged crankshaft for a 4-cylinder engine according to the present invention, embodiments thereof are described in detail below.

1. First Embodiment 1-1. Preform Blank, and Blank for Finish Forging

FIG. 2 is a plan view schematically showing the shapes of a preform blank to be processed by the forming apparatus and a blank for finish forging formed therefrom, in the method for manufacturing in a first embodiment. FIG. 2 shows how a crankshaft for a 4-cylinder 4-counterweight in which first, fourth, fifth and eighth arms have balance weights is manufactured.

Figure 1:
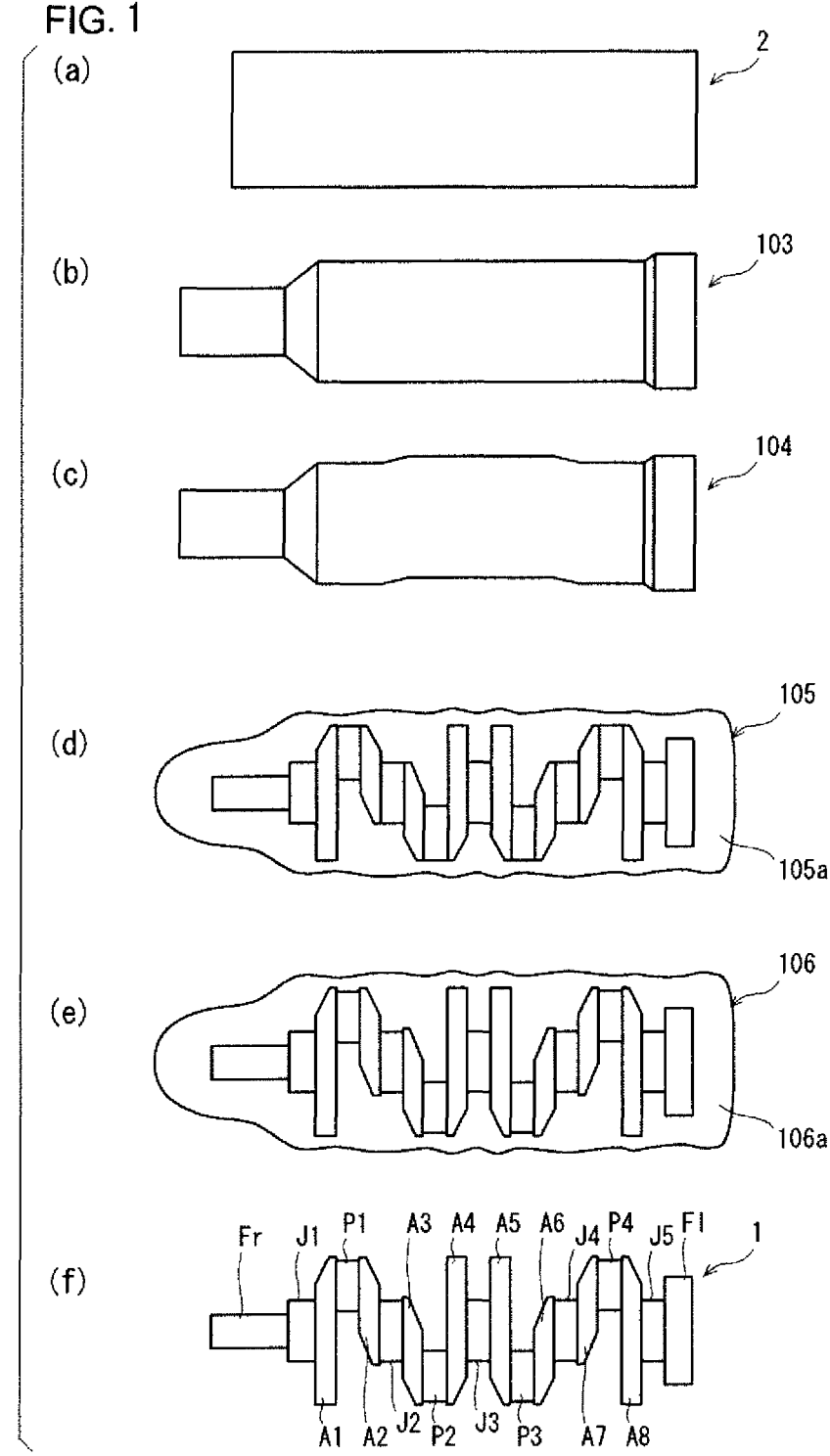
FIG. 1 is a schematic diagram illustrating a typical conventional process for manufacturing a forged crankshaft for 4-cylinder engines.

As shown in FIG. 2, the preform blank 4 of the first embodiment has a crankshaft shape that is approximate to the shape of a forged crankshaft 1 shown in FIG. 1 (*f*) but is generally rough. The preform blank 4 includes: five rough journal portions J1*a* to J5*a*; four rough crank pin portions P1*a* to P4*a*; a rough front part portion Fra; a rough flange portion Fla; and eight rough crank arm portions A1*a* to A8*a* (hereinafter also referred to simply as "rough arm portions A1*a* to A8*a*") that connect the rough journal portions J1*a* to J5*a* and the rough crank pin portion P1*a* to P4*a*. The second, third, sixth and seventh rough arm portions A2*a*, A3*a*, A6*a* and A7*a* have no balance weight, therefore having oval shapes. The preform blank 4 has no flash. Hereinafter, when the rough journal portions J1*a* to J5*a*, the rough crank pin portions P1*a* to P4*a*, and the rough crank arm portions A1*a* to A8*a*, of the preform blank 4, are each collectively referred to, a reference character "Ja" is used for the rough journal portions, a reference character "Pa" for the rough crank pin portions, and a reference character "Aa" for the rough crank arm portions. The first, fourth, fifth and eighth rough arm portions A1*a*, A4*a*, A5*a* and A8*a* having balance weights are also referred to as weighted rough arm portions Aa. On the other hand, the second, third, sixth and seventh rough arm portions A2*a*, A3*a*, A6*a* and A7*a* having no balance weight are also referred to as non-weighted rough arm portions Aa, or oval rough arm portions Aa.

The blank for finish forging 5 of the first embodiment is formed from the preform blank 4 described above using a forming apparatus, details of which will be provided later. The blank for finish forging 5 includes: five rough journal portions J1*b* to J5*b*; four rough crank pin portions P1*b* to P4*b*; a rough front part portion Frb; a rough flange portion Flb; and eight rough crank arm portions A1*b* to A8*b* (hereinafter also referred to simply as "rough arm portions A1*b* to A8*b*") that connect the rough journal portions J1*b* to J5*b* and the rough crank pin portion P1*b* to P4*b*. The second, third, sixth and seventh rough arm portions A2*b*, A3*b*, A6*b* and A7*b* have no balance weight, therefore having oval shapes. The blank for finish forging 5 has no flash. Hereinafter, when the rough journal portions J1*b* to J5*b*, the rough crank pin portions P1*b* to P4*b*, and the rough crank arm portions A1*b* to A8*b*, of the blank for finish forging 5, are each collectively referred to, a reference character "Jb" is used for the rough journal portions, a reference character "Pb" for the rough crank pin portions, and a reference character "Ab" for the rough crank arm portions. The first, fourth, fifth and eighth rough arm portions A1*b*, A4*b*, A5*b* and A8*b* having balance weights are also referred to as weighted rough arm portions Ab. On the other hand, the second, third, sixth and seventh rough arm portions A2*b*, A3*b*, A6*b* and A7*b* having no balance weight are also referred to as non-weighted rough arm portions Ab, or oval rough arm portions Ab.

The blank for finish forging 5 has a shape that is generally in agreement with the shape of the crankshaft (forged final product), and it corresponds to the block forged blank 105 shown in FIG. 1(*d*) with a difference therebetween being the flash. Specifically, the rough journal portions Jb of the blank for finish forging 5 have an axial length equal to that of the journals J of the forged crankshaft having the final shape. The rough crank pin portions Pb of the blank for finish forging 5 have an axial length equal to that of the crank pins P of the forged crankshaft having the final shape, and have an amount of eccentricity in an eccentric direction perpendicular to the axial direction also equal to that of the crank pins P of the forged crankshaft. The rough crank arm portions Ab of the blank for finish forging 5 have an axial thickness equal to that of the crank arms A of the forged crankshaft having the final shape.

Meanwhile, the rough journal portions Ja of the preform blank 4 have an axial length equal to that of the rough journal portions Jb of the blank for finish forging 5, i.e., that of the journals J of the forged crankshaft. The rough crank pin portions Pa of the preform blank 4 have an axial length equal to that of the rough crank pin portions Pb of the blank for finish forging 5, i.e., that of the crank pins P of the forged crankshaft, but have a smaller amount of eccentricity than that of the rough crank pin portions Pb of the blank for finish forging 5.

Among the rough arm portions Aa of the preform blank 4, the weighted rough arm portions Aa (the first, fourth, fifth and eighth rough arm portions A1*a*, A4*a*, A5*a* and A8*a*) have an axial thickness greater than that of the respective weighted rough arm portions Ab of the blank for finish forging 5, i.e., weighted arms A of the forged crankshaft. On the other hand, the oval rough arm portions Aa of the preform blank 4 (the second, third, sixth and seventh rough arm portions A2*a*, A3*a*, A6*a* and A7*a*) have an axial thickness greater than that of the respective oval rough arm portions Ab of the blank for finish forging 5, i.e., the oval arms A of the forged crankshaft. In brief, compared to the blank for finish forging 5 (the forged crankshaft having the final shape), the preform blank 4 has an overall length that is relatively long by the additional thickness of the weighted rough arm portions Aa, and has a relatively small amount of eccentricity of the rough crank pin portions Pa. Thus, the preform blank 4 has a relatively gentle crankshaft shape.

Strictly speaking, though, the blank for finish forging 5 has such a configuration that, with respect to the final shape of the forged crankshaft, the rough arm portions Ab is made slightly thinner and therefore the axial lengths of the rough journal portions Jb and the rough crank pin portions Pb are accordingly slightly greater. This is intended to ensure that the blank for finish forging 5 can be easily received by the dies when finish forging is performed and thereby prevent the occurrence of scoring. Correspondingly, the preform blank 4, too, has such a configuration that, with respect to the final shape of the forged crankshaft, the axial lengths of the rough journal portions Ja and the rough crank pin portions Pa are accordingly slightly greater.

1-2. Process for Manufacturing Forged Crankshaft

Figure 3:
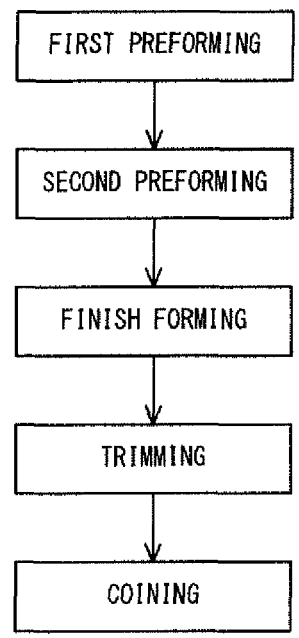
FIG. 3 is a schematic diagram showing a process for manufacturing a forged crankshaft of the first embodiment.

FIG. 3 is a schematic diagram showing a process for manufacturing a forged crankshaft for a 4-cylinder engine in the first embodiment. As shown in FIG. 3, a method for manufacturing a forged crankshaft of the first embodiment includes the steps of first preforming, second preforming and finish forging, and includes, as needed, the steps of trimming and coining.

The first preforming step is a step of obtaining the preform blank 4 described above. In the first preforming step, a round billet having a circular cross section is used as a starting material, and this round billet is heated by a heating furnace (e.g., induction heater, gas atmosphere furnace and the like) and subjected to preforming. For example, the round billet is subjected to roll forming in which it is reduction-rolled by grooved rolls to distribute its volume in the longitudinal direction, and the resulting rolled blank is repeatedly subjected to bending in which it is partially pressed in a press from a direction perpendicular to the longitudinal direction to distribute its volume. Thereby, the preform blank 4 can be obtained. Also, the preform blank 4 may be obtained by using the techniques disclosed in Patent Literatures 1 and 2. Furthermore, cross roll forging, fully-enclosed die forging or the like may also be employed.

The second preforming step is a step of forming the blank for finish forging 5 described above. In the second preforming step, the preforming is performed using a forming apparatus to be described below shown in FIG. 4. In this manner, it is possible to form, from the preform blank 4 described above, the blank for finish forging 5 having the final shape of the forged crankshaft.

The finish forging step is a step of obtaining a forged product having a shape in agreement with the shape of the crankshaft. In the finish forging step, the blank for finish forging 5 described above is processed by press forging with a pair of upper and lower dies. In this manner, it is possible to obtain a forged product having the final shape of a forged crankshaft.

1-3. Forming Apparatus for Blank for Finish Forging

FIG. 4 is a vertical cross sectional view showing the configuration of the forming apparatus in the first embodiment. FIG. 4 exemplifies a forming apparatus for manufacturing a 4-cylinder 4-counterweight crankshaft in which the first, fourth, fifth and eighth arms have balance weights. That is, the blank for finish forging 5 is formed from the preform blank 4 shown in FIG. 2.

As shown in FIG. 4, the forming apparatus is provided as a part of a press machine. The forming apparatus includes a stationary lower pressure pad 20 which serves as a base and an upper pressure pad 21 which is lowered by driving a ram of the press machine. A lower die holder 22, located over the lower pressure pad 20, is resiliently supported via resilient members 24. This lower die holder 22 is vertically movable. As the resilient members 24, disc springs, coil springs, air springs, or the like may be employed, or a hydraulic spring system may be employed. An upper die holder 23 is secured under the upper pressure pad 21 via support posts 25. This upper die holder 23 is lowered together with the upper pressure pad 21 by driving the press machine (ram).

In the forming apparatus shown in FIG. 4, the preform blank 4 is placed in the dies, and is formed into the blank for finish forging. In this manufacturing, the preform blank 4 placed in the dies is oriented in such a manner that the eccentric direction of the rough crank pin portion Pa is in the vertical direction, with the first and fourth rough crank pin portions P1a, P4a positioned in the upper side, i.e., with the second and third rough crank pin portions P2a, P3a positioned in the lower side. Thus, on the lower die holder 22 and the upper die holder 23, there are mounted stationary journal dies 10U, 10B, movable journal dies 11U, 11B, and crank pin dies 12 and auxiliary crank pin dies 13. These stationary journal dies 10U, 10B, movable journal dies 11U, 11B, and crank pin dies 12 and auxiliary crank pin dies 13 are apart from each other into upper and lower ones with respect to the axial direction of the preform blank 4, each of them forming a pair with its upper or lower mate.

The stationary journal dies 10U, 10B, are disposed at locations corresponding to the location of the central, third rough journal portion J3a, which serves as the criterion, among the rough journal portions Ja of the preform blank 4. In the stationary journal dies 10U, 10B, the upper stationary journal die mounted on the upper die holder 23 and the lower stationary journal die mounted on the lower die holder 22. Particularly, the stationary journal dies 10U, 10B, i.e., both the upper and lower ones, are completely secured to the upper die holder 23 and the lower die holder 22, respectively.

The stationary journal dies 10U, 10B have first impressions 10Ua, 10Ba, respectively, each having a semi-cylindrical shape and second impressions 10Ub, 10Bb, respectively. The second impressions 10Ub, 10Bb are located in front of or behind (left or right as seen in FIG. 4) the first impressions 10Ua, 10Ba. The length of the first impressions 10Ua, 10Ba is equal to the axial length of the third rough journal portion J3b of the blank for finish forging 5. The length of the second impressions 10Ub, 10Bb is equal to the axial thickness of the weighted rough arm portions Ab (the fourth and fifth rough arm portions A4b, A5b) of the blank for finish forging 5 which connect with the rough journal portions J3b thereof.

By the lowering of the upper die holder 23 caused by driving the press machine, i.e., the downward movement of the press machine, the stationary journal dies 10U, 10B are caused to hold and retain the third rough journal portion J3a therebetween from above and below with the first impressions 10Ua, 10Ba. Concurrently, the stationary journal dies 10U, 10B are placed in a state in which the second impressions 10Ub, 10Bb, at their first impression 10Ua, 10Ba-side surfaces, are in contact with their third rough journal portion J3a-side side surfaces, at the weighted rough arm portions Aa (the fourth and fifth rough arm portions A4a, A5a) connecting with the third rough journal portion J3a.

The movable journal dies 11U, 11B are disposed at locations corresponding to the locations of the rough journal portions Ja of the preform blank 4 excluding the rough journal portion Ja thereof to be held by the stationary journal dies 10U, 10B. For example, they are disposed at locations corresponding to the locations of Ja (the first, second, fourth and fifth rough journal portions J1a, J2a, J4a, J5a). In the movable journal dies 11U, 11B, the upper ones mounted on the upper die holder 23 and the lower ones mounted on the lower die holder 22. Particularly, the movable journal dies 11U, 11B, i.e., both the upper and lower ones, are axially movable toward the stationary journal dies 10U, 10B on the upper die holder 23 and the lower die holder 22.

The movable journal dies 11U, 11B have first impressions 11Ua, 11Ba, respectively, each having a semi-cylindrical shape, and second impressions 11Ub, 11Bb and third impressions 11Uc, 11Bc. The second impressions 11Ub, 11Bb and the third impressions 11Uc, 11Bc are located in front of or behind (left or right as seen in FIG. 4) the first impressions 11Ua, 11Ba. The length of the first impressions 11Ua, 11Ba is equal to the axial length of the rough journal portions Jb (the first, second, fourth, and fifth rough journal portions J1*b*, J2*b*, J4*b*, J5*b*) of the blank for finish forging 5. The second impressions 11Ub, 11Bb receive the weighted rough arm portions Aa of the preform blank 4. The length of the second impressions 11Ub, 11Bb is equal to the axial thickness of the weighted rough arm portions Ab of the blank for finish forging 5 each of which connects with a corresponding one of the rough journal portions Jb thereof. The third impressions 11Uc, 11Bc receive the oval rough arm portions Aa of the preform blank 4. The length of the third impressions 11Uc, 11Bc is equal to the axial thickness of the oval rough arm portions Ab of the blank for finish forging 5 each of which connects with a corresponding one of the rough journal portions Jb thereof.

In the first embodiment, all of the rough arm portions Aa connecting with the first and fifth rough journal portions J1*a*, J5*a* at the opposite ends are weighted rough arm portions. Thus, the movable journal dies 11U, 11B disposed at locations corresponding to the locations of the first and fifth rough journal portions J1*a*, J5*a* has the second impressions 11Ub, 11Bb, among the second impressions 11Ub, 11Bb and the third impressions 11Uc, 11Bc. On the other hand, all of the rough arm portions Aa connecting with the second and fourth rough journal portions J2*a*, J4*a*, which are closer to the center, are oval rough arm portions. Thus, the movable journal dies 11U, 11B disposed at locations corresponding to the locations of the second and fourth rough journal portions J2*a*, J4*a* has the third impressions 11Uc, 11Bc, among the second impressions 11Ub, 11Bb and the third impressions 11Uc, 11Bc.

By the downward movement of the press machine, the movable journal dies 11U, 11B are caused to hold and retain their corresponding rough journal portions Ja therebetween from above and below with the first impressions 11Ua, 11Ba. Concurrently, in the movable journal dies 11U, 11B, the second impressions 11Ub, 11Bb and the third impressions 11Uc, 11Bc, at their first impressions 11Ua, 11Ba-side surfaces, come in contact with their corresponding rough journal portions Ja, at their rough journal portion Ja-side surfaces, the corresponding weighted rough arm portions Aa and the oval rough arm portions Aa each connecting with a corresponding one of the rough journal portion Ja.

Here, it is noted that the movable journal dies 11U, 11B disposed at locations corresponding to the locations of the first and fifth rough journal portions J1*a*, J5*a*, at opposite ends, each have an end surface that is an inclined surface 14U, 14B. In relation to this, on the lower pressure pad 20, there are provided first wedges 26 located correspondingly to the locations of the inclined surfaces 14U, 14B of the movable journal dies 11U, 11B for the first and fifth rough journal portions J1*a*, J5*a*. Each of the first wedges 26 extends upward penetrating through the lower die holder 22. The inclined surfaces 14B of the lower movable journal dies 11B, among the movable journal dies 11U, 11B for the first and fifth rough journal portions J1*a*, J5*a*, are in contact with the slopes of the first wedges 26 in the initial condition. On the other hand, the inclined surfaces 14U of the upper movable journal dies 11U are brought into contact with the slopes of the first wedges 26 by the downward movement of the press machine.

The movable journal dies 11U, 11B disposed at locations corresponding to the location of the second and fourth rough journal portions J2*a*, J4*a*, which are closer to the center, are provided with blocks, not shown, secured thereto. The blocks have inclined surfaces 15U, 15B at side sections (front and rear in FIG. 4) apart from the first impressions 11Ua, 11Ba and the second impressions 11Ub, 11Bb. In relation to this, on the lower pressure pad 20, there are provided second wedges 27 located correspondingly to the locations of the inclined surfaces 15U, 15B of the movable journal dies 11U, 11B for the second and fourth rough journal portions J2*a*, J4*a*. Each of the second wedges 27 extends upward penetrating through the lower die holder 22. The inclined surfaces 15B of the lower movable journal dies 11B, among the movable journal dies 11U, 11B for the second and fourth rough journal portions J2*a*, J4*a*, are in contact with the slopes of the second wedges 27 in the initial condition. On the other hand, the inclined surfaces 15U of the upper movable journal dies 11U are brought into contact with the slopes of the second wedges 27 by the downward movement of the press machine.

Then, with continued downward movement of the press machine, the upper movable journal dies 11U are pressed downwardly together with the lower movable journal dies 11B. This allows the movable journal dies 11U, 11B for the first and fifth rough journal portions J1*a*, J5*a*, i.e., both the upper and lower ones, to move their inclined surfaces 14U, 14B slide along the slopes of the first wedges 26. With this, they move in the axial direction toward the stationary journal dies 10U, 10B for the third rough journal portion J3*a*, which serves as the criterion. Concurrently, the movable journal dies 11U, 11B for the second and fourth rough journal portions J2*a*, J4*a*, i.e., both the upper and lower ones, are allowed to move their inclined surfaces 15U, 15B slide along the slopes of the second wedges 27. As a result, the movable journal dies 11U, 11B move axially toward the stationary journal dies 10U, 10B for the third rough journal portion J3*a*, which serves as the criterion, as their inclined surfaces 15U, 15B slide along the slopes of the second wedges 27. In short, the movable journal dies 11U, 11B are all capable of being moved axially by the wedge mechanisms.

The crank pin dies 12 and the auxiliary crank pin dies 13, which form upper and lower pairs, are disposed at locations corresponding to the locations of the rough crank pin portions Pa of the preform blank 4. In the crank pin dies 12 and the auxiliary crank pin dies 13, the upper ones mounted on the upper die holder 23 and the lower ones mounted on the lower die holder 22. The crank pin dies 12 are disposed at locations facing inner sides of the respective rough crank pin portions Pa, whereas the mating auxiliary crank pin dies 13 are disposed at locations facing outer sides, opposite to the inner sides, of the respective rough crank pin portions Pa. For example, the first rough crank pin portion P1*a* is positioned at an upper side location. And thus the crank pin die 12 therefor is mounted on the lower die holder 22 and the auxiliary crank pin die 13 therefor is mounted on the upper die holder 23.

Particularly, all the crank pin dies 12 and the auxiliary crank pin dies 13, i.e., both the upper and lower ones, are axially movable toward the stationary journal dies 10U, 10B on the upper die holder 23 and the lower die holder 22. The crank pin dies 12 are movable in the eccentric direction toward the rough crank pin portions Pa.

The crank pin dies 12 and the auxiliary crank pin dies 13 have impressions 12a, 13a having a semi-cylindrical shape, respectively. The length of the impressions 12a, 13a is equal to the axial length of the rough crank pin portions P b of the blank for finish forging 5.

By the downward movement of the press machine, the crank pin dies 12 are placed in a state in which their impressions 12a receive the respective rough crank pin portions Pa at their inner sides. Furthermore the side surfaces of each crank pin dies 12 are in contact with corresponding ones of the rough arm portions Aa, at their rough crank pin portion Pa-side side surfaces, the corresponding ones of the rough arm portions Aa connecting with a corresponding one of the rough crank pin portions Pa.

Then, the crank pin dies 12 and the auxiliary crank pin dies 13 are pressed downwardly together with continued downward movement of the press machine. Accordingly, with the axial movement of the movable journal dies 11U, 11B as described above, the crank pin dies 12 and the auxiliary crank pin dies 13 are moved axially along with them toward the stationary journal dies 10U, 10B for the third rough journal portion J3a which serves as the criterion. The movement of the crank pin dies 12 in the eccentric direction is accomplished by driving the hydraulic cylinder 16 coupled to the crank pin dies 12.

It is noted that the axial movement of the crank pin dies 12 and the auxiliary crank pin dies 13 may be forcibly caused using a wedge mechanism similar to the one for the movable journal dies 11U, 11B or a separate mechanism such as a hydraulic cylinder, a servo motor or the like. The auxiliary crank pin dies 13 may be integral with one of their adjacent movable journal dies 11U, 11B.

In the initial condition shown in FIG. 4, spaces are provided between the axial arranged stationary journal dies 10U, 10B and the movable journal dies 11U, 11B and their corresponding crank pin dies 12 and the auxiliary crank pin dies 13. The spaces are provided so as to allow the axial movement of the movable journal dies 11U, 11B as well as that of the crank pin dies 12 and the auxiliary crank pin dies 13. The size of the spaces represents the difference between the thickness of the weighted rough arm portions Ab of the blank for finish forging 5 and the thickness of the weighted rough arm portions Aa of the preform blank 4.

Now, descriptions are given of how the blank for finish forging is formed using the thus configured forming apparatus.

Figure 5A:
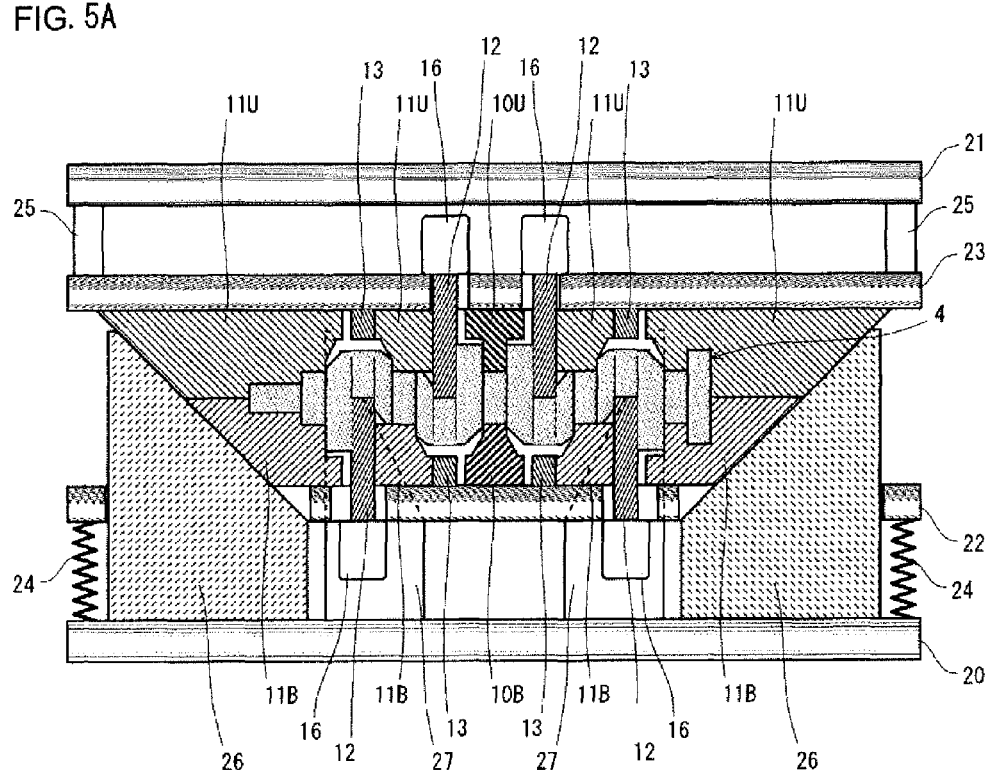
FIG. 5A is a longitudinal cross sectional view illustrating a process for forming a blank for finish forging using the forming apparatus of the first embodiment shown in FIG. 4, with a state at an initial stage of forming shown therein.
Figure 5B:
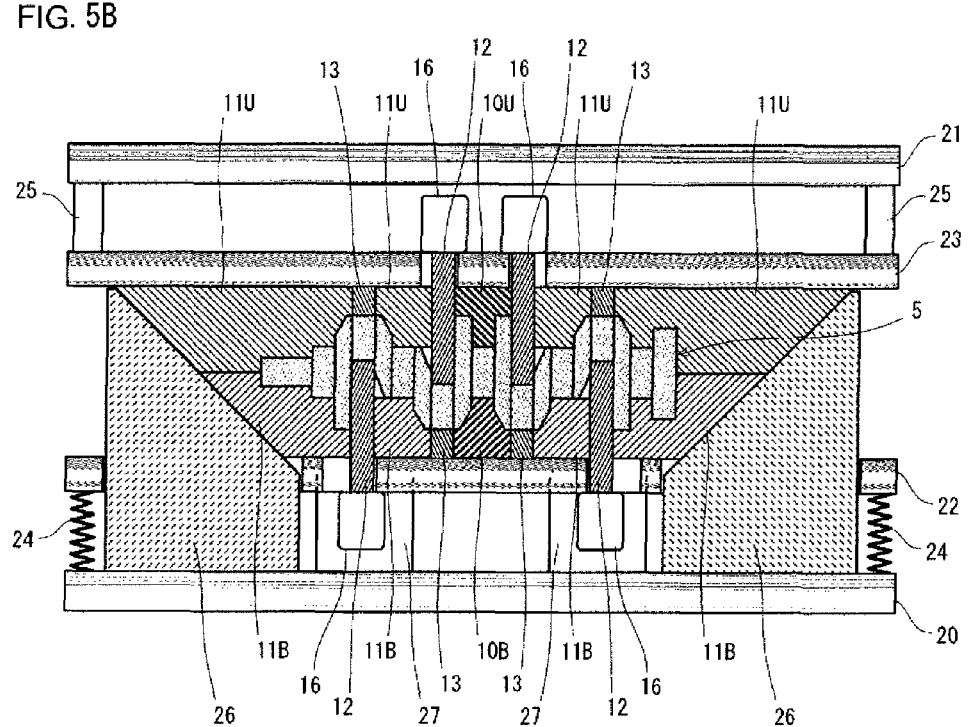
FIG. 5B is a longitudinal sectional view illustrating a process for forming a blank for finish forging using the forming apparatus of the first embodiment shown in FIG. 4, with a state at the completion of forming shown therein.

FIG. 5A and FIG. 5B are longitudinal sectional views illustrating a process for forming a blank for finish forging using the forming apparatus of the first embodiment shown in FIG. 4, FIG. 5A shows a state at an initial stage of forming and FIG. 5B shows a state at the completion of forming.

The preform blank 4 is placed in the lower stationary journal die 10B, the lower movable journal dies 11B, and the lower crank pin dies 12 and lower auxiliary crank pin dies 13 shown in FIG. 4, and then lowering of the press machine is started. Then, as shown in FIG. 5A, the upper stationary journal dies 10U and the upper movable journal dies 11U are brought into contact with the respective lower stationary journal dies 10B and lower movable journal dies 11B.

Thus, the preform blank 4 is placed in a state in which the rough journal portions Ja are held by the stationary journal dies 10U, 10B and the movable journal dies 11U, 11B from above and below, and the rough crank pin portions Pa, at their inner sides, are contacted by the crank pin dies 12. In this state, in the preform blank 4, the rough arm portions Aa, at their rough journal portion Ja-side side surfaces, are in contact with the stationary journal dies 10U, 10B and the movable journal dies 11U, 11B, and, at their rough crank pin portion Pa-side side surfaces, are in contact with the crank pin dies 12. Also, the inclined surfaces 14U, 14B of the movable journal dies 11U, 11B for the first and fifth rough journal portions J1a, J5a are in contact with the slopes of the first wedges 26 Furthermore, the inclined surfaces 15U, 15B of the movable journal dies 11U, 11B for the second and fourth rough journal portions J2a, J4a are in contact with the slopes of the second wedges 27.

In this state, the lowering of the press machine is continued. Accordingly, the inclined surfaces 14U, 14B of the movable journal dies 11U, 11B for the first and fifth rough journal portions J1a, J5a slide along the slopes of the first wedges 26. By this wedge mechanism, these movable journal dies 11U, 11B are allowed to move axially toward the stationary journal dies 10U, 10B for the third rough journal portion J3a. Concurrently, the inclined surfaces 15U, 15B of the movable journal dies 11U, 11B for the second and fourth rough journal portions J2a, J4a slide along the slopes of the second wedges 27. By this wedge mechanism, these movable journal dies 11U, 11B are allowed to move axially toward the stationary journal dies 10U, 10B for the third rough journal portion J3a. By such axial movement of the movable journal dies 11U, 11B caused by the wedge mechanism, the crank pin dies 12 and the auxiliary crank pin dies 13 are also allowed to move axially toward the stationary journal dies 10U, 10B for the third rough journal portion J3a.

In this condition, the movable journal dies 11U, 11B, and the crank pin dies 12 and the auxiliary crank pin dies 13 for the rough journal portions Ja and the rough crank pin portions Pa connecting with the oval rough arm portions Ab move axially together. For example, since the second rough arm portion A2b is an oval rough arm portion, the movable journal dies 11U, 11B, and the crank pin dies 12 and the auxiliary crank pin dies 13 for the second rough journal portion J2a and the first rough crank pin portion P1a connecting with this second rough arm portion A2b move axially together. Furthermore, since the third rough arm portion A3b connecting with the second rough journal portion J2a is also an oval rough arm portion, the crank pin dies 12 and the auxiliary crank pin dies 13 for the second rough crank pin portion P2a connecting with this third rough arm portion A3b move axially together as well.

Accordingly, the spaces between the stationary journal dies 10U, 10B and the movable journal dies 11U, 11B and their corresponding crank pin dies 12 and auxiliary crank pin dies 13 are gradually reduced, and finally they disappear. In this process, in the preform blank 4, the weighted rough arm portions Aa are axially compressed, so that the thickness of the weighted rough arm portions Aa is reduced to the thickness of the rough arm portions Ab of the blank for finish forging 5 (see FIG. 5B). In this process, the axial lengths of the rough journal portions Ja and the rough crank pin portions Pa are maintained.

Also, in response to the axial movement of the movable journal dies 11U, 11B as well as that of the crank pin dies 12 and the auxiliary crank pin dies 13, the hydraulic cylinder 16 for the crank pin dies 12 is driven. Accordingly, the crank pin dies 12 press the respective rough crank pin portions Pa of the preform blank 4 in the eccentric direction. Thus, the rough crank pin portions Pa of the preform blank 4 are displaced in the eccentric direction, and the amount of eccentricity is increased to the amount of eccentricity of the rough crank pin portions Pb of the blank for finish forging 5 (see FIG. 5B).

In this manner, it is possible to form, from the preform blank 4 without a flash, the blank for finish forging 5 without a flash. The blank for finish forging 5 has a shape generally in agreement with the shape of the forged crankshaft for a 4-cylinder engine (forged final product) having thin arms A even the weighted arms A. By using such a blank for finish forging 5 without a flash in finish forging and applying finish forging thereto, it is possible to obtain the final shape of the forged crankshaft for a 4-cylinder engine including the contour shape of crank arms although some minor amount of flash is generated. Therefore, forged crankshafts for 4-cylinder engines can be manufactured with high material utilization and also with high dimensional accuracy regardless of their shapes.

In the forming apparatus shown in FIGS. 4 to 5B, the inclined surfaces 14U, 14B of the movable journal dies 11U, 11B for the first rough journal portion J1a plus the slope of the first wedge 26 that is in contact therewith and the inclined surfaces 14U, 14B of the movable journal dies 11U, 11B for the fifth rough journal portion J5a plus the slope of the first wedge 26 that is in contact therewith are angled in a reverse relationship relative to a vertical plane. Also, the inclined surfaces 15U, 15B of the movable journal dies 11U, 11B for the second rough journal portion J2a plus the slope of the second wedge 27 that is in contact therewith and the inclined surfaces 15U, 15B of the movable journal dies 11U, 11B for the fourth rough journal portion J4a plus the slope of the second wedge 27 that is in contact therewith are angled in a reverse relationship relative to a vertical plane. Furthermore, the angle of the slopes of the first wedges 26 (the angle of the inclined surfaces 14U, 14B of the movable journal dies 11U, 11B for the first and fifth rough journal portions J1a, J5a) is greater than the angle of the slopes of the second wedges 27 (the angle of the inclined surfaces 15U, 15B of the movable journal dies 11U, 11B for the second and fourth rough journal portions J2a, J4a). The purpose of varying, for each of the movable journal dies 11U, 11B, the wedge angle of the wedge mechanism, which causes the axial movement of the movable journal dies 11U, 11B, is to ensure that the rate of deformation at which the weighted rough arm portions Aa are axially compressed to reduce the thickness thereof can be constant for all the weighted rough arm portions Aa.

In the preform blank 4 which is to be processed by the forming apparatus shown in FIGS. 4 to 5B, the rough journal portions Ja have a cross-sectional area that is equal to or greater than that of the rough journal portions Jb of the blank for finish forging 5, i.e., that of the journal J of the forged crankshaft. Likewise, the rough crank pin portions Pa of the preform blank 4 have a cross-sectional area that is equal to or greater than that of the rough crank pin portions Pb of the blank for finish forging 5, i.e., that of the crank pins P of the forged crankshaft. Even when the cross-sectional area of the rough journal portions Ja of the preform blank 4 is greater than the cross-sectional area of the rough journal portions Jb of the blank for finish forging 5, it is possible to reduce the cross-sectional area of the rough journal portions Ja to the cross-sectional area of the rough journal portions Jb of the blank for finish forging 5. This is performed by the holding and retaining of the rough journal portions Ja by the stationary journal dies 10U, 10B and the movable journal dies 11U, 11B, and by the subsequent axial movement of the movable journal dies 11U, 11B. Even when the cross-sectional area of the rough crank pin portions Pa of the preform blank 4 is greater than the cross-sectional area of the rough crank pin portions Pb of the blank for finish forging 5, it is possible to reduce the cross-sectional area of the rough crank pin portions Pa to the cross-sectional area of the rough crank pin portions Pb of the blank for finish forging 5. This is caused by the movement of the crank pin dies 12 in the axial direction and in the eccentric direction.

An issue to be addressed regarding the forming of the blank for finish forging described above is local formation of fin flaws at the weighted rough arm portions Aa. The following describes how fin flaws are formed and how they can be prevented.

Figure 6:
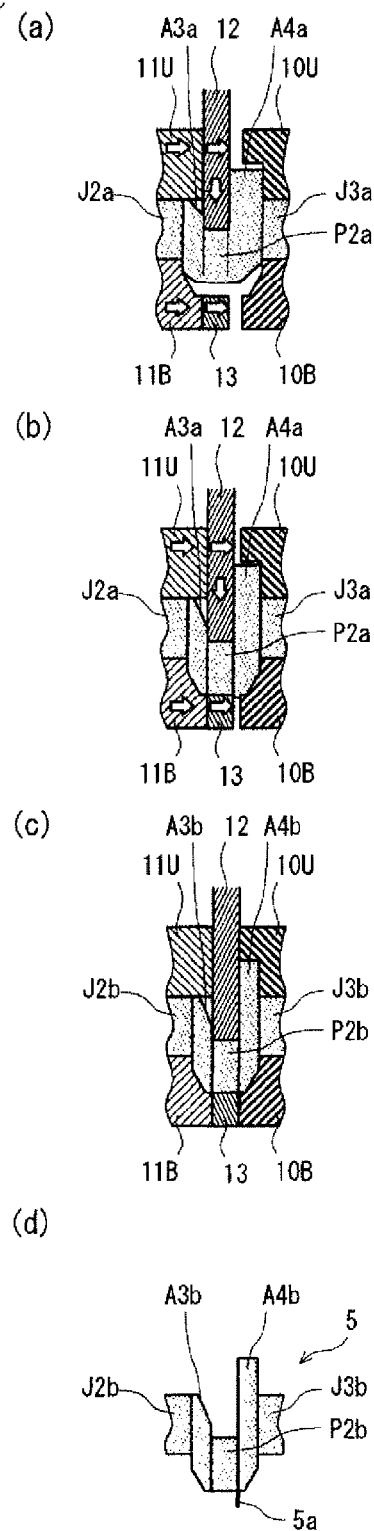
FIG. 6 is a diagram illustrating how fin flaws occur in forming a blank for finish forging using the forming apparatus.
Figure 7:
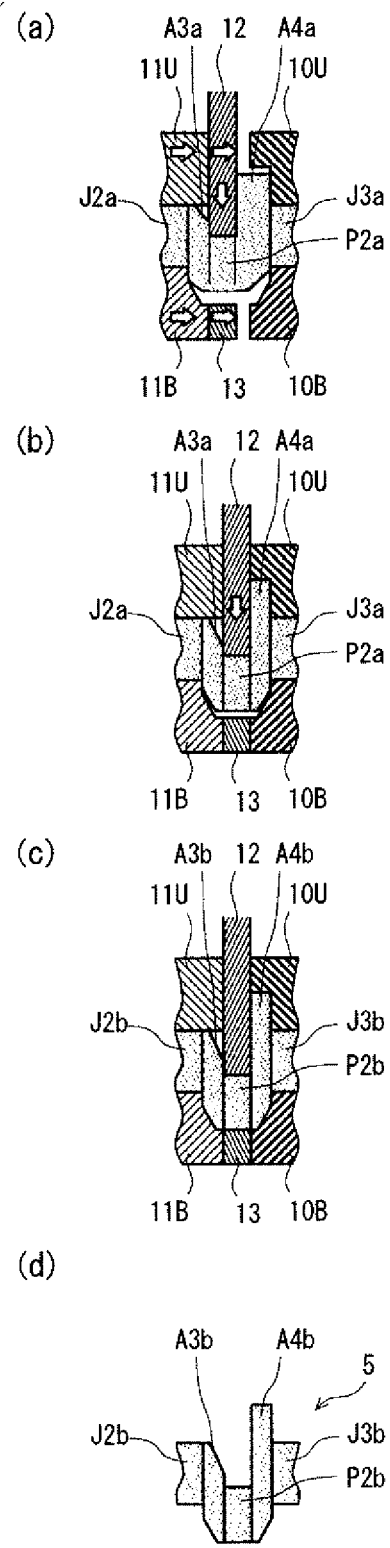
FIG. 7 is a diagram illustrating how fin flaws are prevented by taking a measure in forming a blank for finish forging using the forming apparatus.

FIG. 6 is a diagram illustrating how fin flaws occur in forming a blank for finish forging using the forming apparatus, and FIG. 7 is a diagram illustrating how fin flaws are prevented by taking a measure. In FIGS. 6 and 7, (a) shows a state at an initial stage of forming; (b) shows a state during the process of forming; (c) shows a state at the completion of forming; and (d) shows the blank for finish forging removed from the forming apparatus after the completion of forming.

As shown in FIG. 6(a), upon the start of the forming operation, the movable journal dies 11U, 11B move axially, and the crank pin dies 12 and the auxiliary crank pin dies 13 move axially and in the eccentric direction. Then, as shown in FIG. 6(b), for the weighted rough arm portions Aa, if the rough crank pin portions Pa in the process of eccentrically deformation reach the auxiliary crank pin dies 13 before the completion of the axial movement of the movable journal dies 11U, 11B, and the crank pin dies 12 and the auxiliary crank pin dies 13, i.e., before the spaces between the stationary journal dies 10U, 10B and the movable journal dies 11U, 11B and their corresponding crank pin dies 12 and auxiliary crank pin dies 13 are filled, a problem to be described below will occur. The fillings of the rough crank pin portions Pa flow into the spaces between the auxiliary crank pin dies 13 and their corresponding stationary journal dies 10U, 10B and movable journal dies 11U, 11B. Although the fillings that have flowed thereinto are thinned with the progress of the forming operation, they remain there even after the forming operation is completed as shown in FIG. 6(c). Thus, as shown in FIG. 6(d), fin flaws 5a, coming out of the rough crank pin portions Pb of the blank for finish forging 5, are formed locally at the boundaries with adjacent weighted rough arm portions Aa.

In the subsequent finish forging step, the fin flaws 5a will be struck into the finished product, resulting in overlaps. Therefore, in order to ensure product quality, it is necessary to prevent the formation of fin flaws.

One measure to prevent the formation of fin flaws may be to control the movement of the crank pin dies 12 in the eccentric direction so that the rough crank pin portions Pa in the process of eccentric deformation reach the auxiliary crank pin dies 13 after the spaces between the stationary journal dies 10U, 10B and the movable journal dies 11U, 11B and their corresponding crank pin dies 12 and auxiliary crank pin dies 13 are filled in the weighted rough arm portions Aa. Specifically, the movement of the crank pin dies 12 in the eccentric direction may be completed after the axial movement of the movable journal dies 11U, 11B and the crank pin dies 12 and the auxiliary crank pin dies 13 is completed. For example, when the total moved distance of the crank pin dies 12 in the eccentric direction is designated as a 100% moved distance thereof, it is preferable that, at the completion of the axial movement of the movable journal dies 11U, 11B that are adjacent to the crank pin dies 12, the moved distance of the crank pin dies 12 in the eccentric direction is 90% or less (more preferably 83% or less, and even more preferably 60% or less) of the total moved distance. After the completion of the movement of the movable journal dies 11U, 11B, the movement of the crank pin dies 12 in the eccentric direction may be completed.

For example, the forming operation is started as shown in FIG. 7(a). And then, as shown in FIG. 7(b), in the weighted rough arm portions Aa, the axial movement of the movable journal dies 11U, 11B as well as that of the crank pin dies 12 and the auxiliary crank pin dies 13 is completed before the length of movement of the crank pin dies 12 in the eccentric direction reaches 90% of the total length of movement. Consequently, by this time, the spaces between the stationary journal dies 10U, 10B and the movable journal dies 11U, 11B and their corresponding crank pin dies 12 and auxiliary crank pin dies 13 have been filled, whereas the rough crank pin portions Pa in the process of eccentric deformation have not reached the auxiliary crank pin dies 13. Subsequently, along with the movement of the crank pin dies 12 in the eccentric direction, the rough crank pin portions Pa reach the auxiliary crank pin dies 13, and with the completion of the movement, the forming is completed as shown in FIG. 7(c). Thus, no such problem occurs as the fillings of the rough crank pin portions Pa flow into the spaces between the auxiliary crank pin dies 13 and their corresponding stationary journal dies 10U, 10B and movable journal dies 11U, 11B. As a result, as shown in FIG. 7(d), a high quality blank for finish forging 5 without fin flaws can be obtained.

The process of movement of the crank pin dies in the eccentric direction before the completion of the axial movement of the movable journal dies may be varied as desired. For example, the movement of the crank pin dies in the eccentric direction may be started simultaneously with the start of the axial movement of the movable journal dies or in advance of that, or conversely, it may be started after the axial movement of the movable journal dies has progressed to some extent. Also, the movement of the crank pin dies in the eccentric direction may be stopped temporarily, after its start, at positions a certain distance away from their initial positions, and it may be resumed after the completion of the axial movement of the movable journal dies.

2. Second Embodiment

A second embodiment is based on the configuration of the first embodiment described above, the mode of a 4-cylinder 4-counterweight crankshaft to be manufactured is modified, and the configuration relating to this modification is modified. It is noted that the configuration of the second embodiment will be described below with reference to the drawings, components common to those of the first embodiment will be denoted by the same reference characters, and the descriptions of duplicated matter will not be made.

2-1. Preform Blank, and Blank for Finish Forging

FIG. 8 is a plan view schematically showing the shapes of a preform blank to be processed by the forming apparatus and a blank for finish forging formed therefrom, in the method for manufacturing in a second embodiment. What is to be manufactured in the second embodiment is a 4-cylinder 4-counterweight crankshaft, and in the crankshaft, the second, fourth, fifth, and seventh arms have balance weights.

As shown in FIG. 8, the preform blank 4 of the second embodiment is different from the preform blank 4 of the first embodiment shown in FIG. 2 described above in the following points. In the preform blank 4 of the second embodiment, among the first and second rough arm portions A1a, A2a connecting with the first rough pin P1a at the fore end, the first rough arm portion A1a is an oval rough arm portion Aa, and the second rough arm portion A2a is a weighted rough arm portion Aa. Among the seventh and eighth rough arm portions A7a, A8a connecting with the fourth rough pin P4a at the rear end, the eighth rough arm portion A8a is an oval rough arm portion Aa, and the seventh rough arm portion A7a is a weighted rough arm portion Aa.

In conformity with this, in the blank for finish forging 5 of the second embodiment, the first rough arm portion A1b is an oval rough arm portion Ab, the second rough arm portion A2b is a weighted rough arm portion Ab. The eighth rough arm portion A8b is an oval rough arm portion Ab, and the seventh rough arm portion A7b is a weighted rough arm portion Ab.

2-2. Process for Manufacturing Forged Crankshaft

It is the same as the manufacturing process of the first embodiment shown in FIG. 3 described above.

2-3. Apparatus for Forming Blank for Finish Forging

Figure 9:
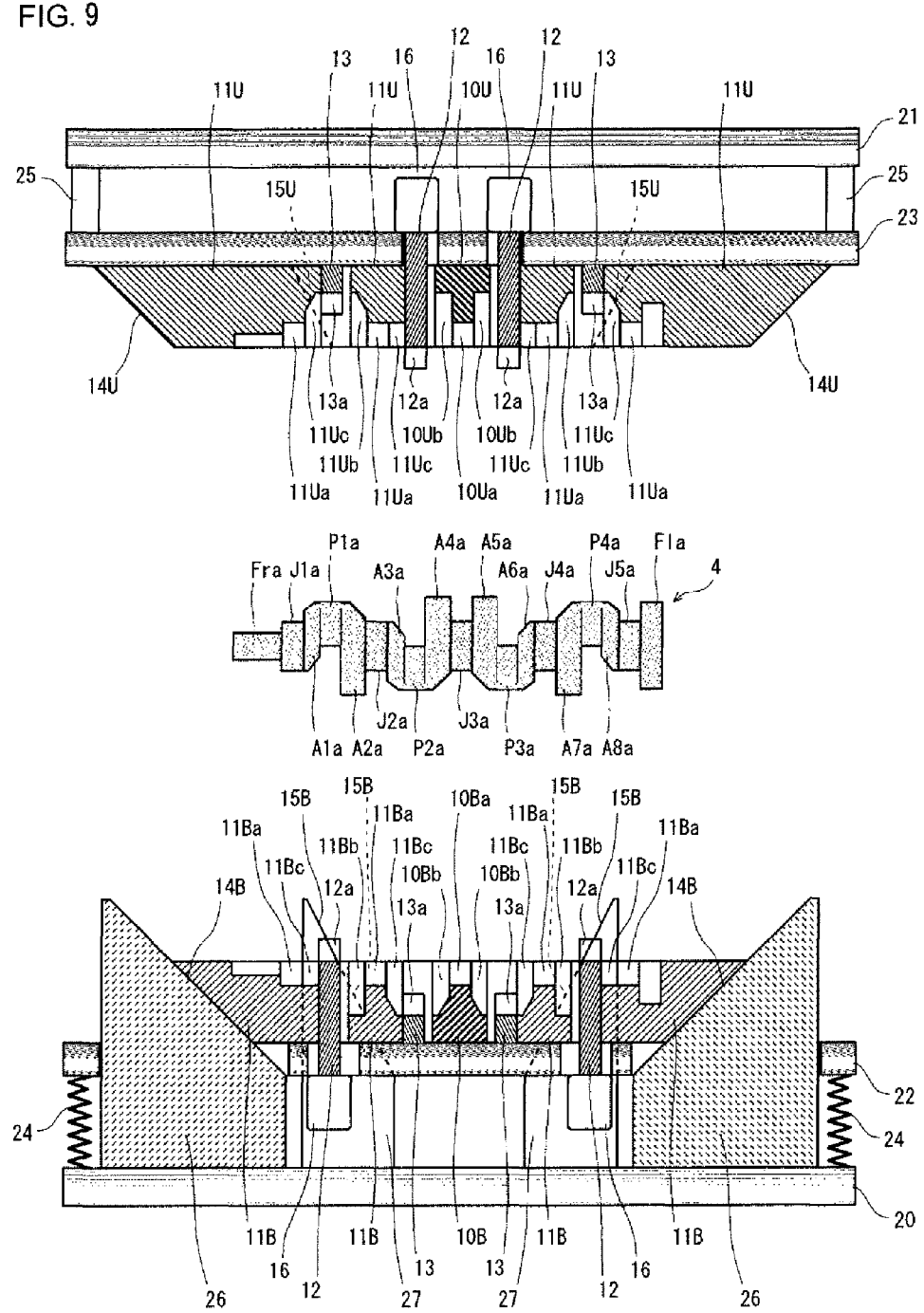
FIG. 9 is a vertical cross sectional view showing the configuration of the forming apparatus in the second embodiment.
Figure 10A:
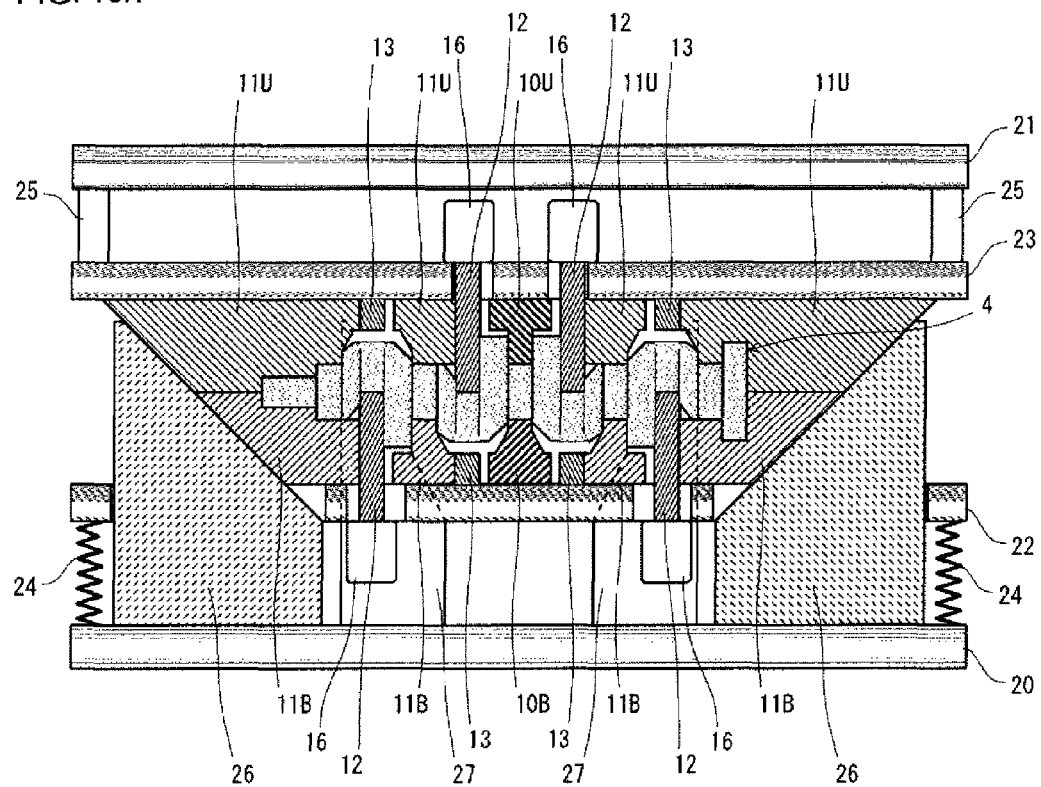
FIG. 10A is a longitudinal cross sectional view illustrating a process for forming a blank for finish forging using the forming apparatus of the second embodiment shown in FIG. 9, with a state at an initial stage of forming shown therein.
Figure 10B:
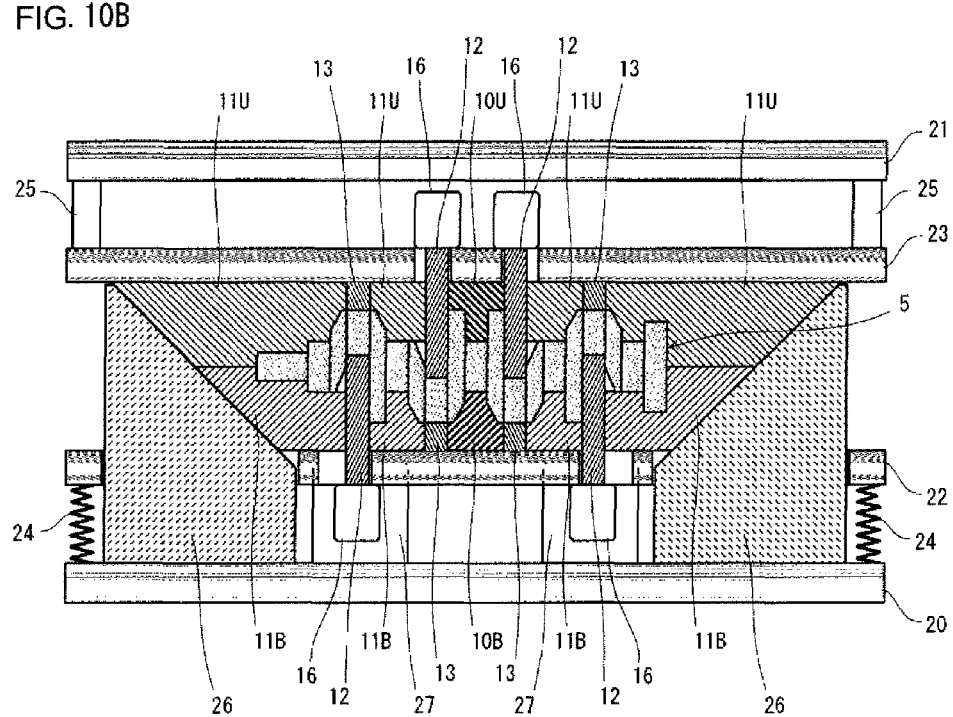
FIG. 10B is a longitudinal cross sectional view illustrating a process for forming a blank for finish forging using the forming apparatus of the second embodiment shown in FIG. 9, with a state at the completion of forming shown therein.

FIG. 9 is a vertical cross sectional view showing the configuration of the forming apparatus in the second embodiment. FIG. 10A and FIG. 10B are longitudinal cross sectional views illustrating a process for forming a blank for finish forging using the forming apparatus of the second embodiment shown in FIG. 9. Among these diagrams, FIG. 10A shows a state at an initial stage of forming, and FIG. 10B shows a state at the completion of forming.

As shown in FIG. 9, in the second embodiment, all of the rough arm portion Aa connecting with the first and fifth rough journal portions J1a, J5a at the opposite ends are oval rough arm portions. Thus, the movable journal dies 11U, 11B disposed at locations corresponding to the locations of the first and fifth rough journal portions J1a, J5a has the third impressions 11Uc, 11Bc, among the second impressions 11Ub, 11Bb and the third impressions 11Uc, 11Bc. On the other hand, the rough arm portions Aa connecting with the second and fourth rough journal portions J2a, J4a, which are closer to the center, are a weighted rough arm portion and an oval rough arm portion. Thus, the movable journal dies 11U, 11B disposed at locations corresponding to the locations of the second and fourth rough journal portions J2a, J4a has the second impressions 11Ub, 11Bb and the third impressions 11Uc, 11Bc.

As shown in FIG. 10A and FIG. 10B, by the downward movement of the press machine, the movable journal dies 11U, 11B are allowed to move axially toward the stationary journal dies 10U, 10B for the third rough journal portion J3a. With this, the crank pin dies 12 and the auxiliary crank pin dies 13 also move axially toward the stationary journal dies 10U, 10B for the third rough journal portion J3a.

In this process, the movable journal dies 11U, 11B, and the crank pin dies 12 and the auxiliary crank pin dies 13 for the rough journal portions Ja and the rough crank pin portions Pa connecting with the oval rough arm portions Ab move axially together. For example, the third rough arm portion A3b is an oval rough arm portion. Thus, the movable journal dies 11U, 11B, and the crank pin dies 12 and the auxiliary crank pin dies 13 for the third rough journal portion J3a and the second rough crank pin portion P2a connecting with the third rough arm portion A3b move axially together. On the other hand, unlike the first embodiment described above, the second rough arm portion A2b connecting with the second rough journal portion J2a is a weighted rough arm portion. Thus, the crank pin dies 12 and the auxiliary crank pin dies 13 for the first rough crank pin portion P1a connecting with the second rough arm portion A2b do not move together with the movable journal dies 11U, 11B for the third rough journal portion J3a. Instead, the crank pin dies 12 and the auxiliary crank pin dies 13 for the first rough crank pin portion P1a move together with the movable journal dies 11U, 11B for the first rough journal portion J1a. This is because the first rough arm portion A1a connecting with the first rough journal portion J1a and the first rough crank pin portion P1a is an oval rough arm portion.

Accordingly, the spaces between the stationary journal dies 10U, 10B and the movable journal dies 11U, 11B and their corresponding crank pin dies 12 and auxiliary crank pin dies 13 are gradually reduced, and finally they disappear. In this process, in the preform blank 4, the weighted rough arm portions Aa are axially compressed by the stationary journal dies 10U, 10B, the movable journal dies 11U, 11B, and the crank pin dies 12, so that the thickness of the weighted rough arm portions Aa is reduced to the thickness of the rough arm portion Ab of the blank for finish forging 5 (see FIG. 5B). At that point, the axial lengths of the rough journal portions Ja and the rough crank pin portions Pa are maintained.

In response to the axial movement of the movable journal dies 11U, 11B as well as that of the crank pin dies 12 and the auxiliary crank pin dies 13, the hydraulic cylinder 16 for the crank pin dies 12 is driven, and the crank pin dies 12 press the respective rough crank pin portions Pa of the preform blank 4 in the eccentric direction. Thus, the rough crank pin portions Pa of the preform blank 4 are displaced in the eccentric direction, and the amount of eccentricity is increased to the amount of eccentricity of the rough crank pin portions Pb of the blank for finish forging 5 (see FIG. 5B).

In this manner, also in the second embodiment, it is possible to form, from the preform blank 4 without a flash, the blank for finish forging 5 without a flash. The blank for finish forging 5 has a shape generally in agreement with the shape of the forged crankshaft for a 4-cylinder engine (forged final product) having thin arms A even the weighted arms A. Therefore, the same effect as that of the first embodiment described above can be provided.

The present invention is not limited to the embodiments described above, and various modifications may be made without departing from the spirit and scope of the present invention. For example, the mechanism for causing the movable journal dies to move axially is not limited to the one described in the above embodiment, in which a wedge mechanism of a press machine is employed. Alternatively, a link mechanism may be employed, or a hydraulic cylinder, a servo motor or the like may be employed in place of a press machine. Furthermore, the mechanism for causing the crank pin dies to move in the eccentric direction is not limited to a hydraulic cylinder, and it may be a servo motor.

Furthermore, the embodiment described above has such a configuration that the upper die holder is secured to the upper pressure pad while the lower die holder is resiliently supported on the lower pressure pad on which the wedges are installed, and the upper and lower movable journal dies are allowed to move by the wedges, but alternatively, the functions of the upper section and the lower section may be reversed. The configuration may also be such that the upper and lower die holders are resiliently supported on the respective pressure pads, and that wedges are installed on both pressure pads so that the upper and lower movable journal dies are caused to move by their corresponding wedges.

Furthermore, in the above embodiment, the auxiliary crank pin dies are movable only axially, but additionally, they may be made to be movable also in a direction opposite to the eccentric direction. In this case, the crank pin dies and the auxiliary crank pin dies hold and retain the rough crank pin portions Pa therebetween from above and below and meanwhile move in the eccentric direction cooperatively with each other.

INDUSTRIAL APPLICABILITY

The present invention is useful in manufacturing forged crankshafts for 4-cylinder engines.

REFERENCE SIGNS LIST

1: forged crankshaft, J, J1 to J5: journals,
P, P1 to P4: crank pins, Fr: front part,
Fl: flange, A, A1 to A8: crank arms,
2: billet,
4: preform blank, Ja, J1a to J5a: rough journal portions of preform blank,
Pa, P1a to P4a: rough crank pin portions of preform blank, Fra: rough front part portion of preform blank,
Fla: rough flange portion of preform blank,
Aa, A1a to A8a: rough crank arm portions of preform blank,
5: blank for finish forging, Jb, J1b to J5b: rough journal portions of blank for finish forging,
Pb, P1b to P4b: rough crank pin portions of blank for finish forging, Frb: rough front part portion of blank for finish forging,
F1b: rough flange portion of blank for finish forging,
Ab, A1b to A8b: rough crank arm portions of blank for finish forging,
5a: fin flaws,
10U, 10B: stationary journal die,
10Ua, 10Ba: first impression of stationary journal die,
10Ub, 10Bb: second impression of stationary journal die,
11U, 11B: movable journal die,
11Ua, 11Ba: first impression of movable journal die,
11Ub, 11Bb: second impression of movable journal die,
11Uc, 11Bc: third impression of movable journal die,
12: crank pin die, 12a: impression,
13: auxiliary crank pin die, 13a: impression,
14U, 14B: inclined surfaces of movable journal dies for first and fifth rough journal portions,
15U, 15B: inclined surfaces of movable journal dies for second and fourth rough journal portions,
16: hydraulic cylinder,
20: lower pressure pad, 21: upper pressure pad,
22: lower die holder, 23: upper die holder,
24: resilient member, 25: support post,
26: first wedge, 27: second wedge

The invention claimed is:

1. An apparatus for forming a blank for finish forging for a forged crankshaft for a 4-cylinder engine, the apparatus configured to form, in a process of manufacturing a forged crankshaft for a 4-cylinder engine, a blank for finish forging to be subjected to finish forging by which a final shape of the forged crankshaft is obtained, from a preform blank, wherein in the forged crankshaft,
fourth and fifth crank arms connecting with a central third journal have balance weights,
any one of first and second crank arms connecting with a first crank pin at a fore end has a balance weight, and any one of seventh and eighth crank arms connecting with a fourth crank pin at a rear end has a balance weight, and
the remaining crank arms have no balance weights,
the preform blank includes:
rough journal portions having an axial length equal to an axial length of journals of the forged crankshaft;
rough crank pin portions having an axial length equal to an axial length of crank pins of the forged crankshaft and having a smaller amount of eccentricity in an eccentric direction perpendicular to the axial direction than an amount of eccentricity of the crank pins of the forged crankshaft; and among the crank arms of the forged crankshaft, non-weighted rough crank arm portions corresponding to non-weighted crank arms not having the balance weights, the non-weighted rough crank arm portions having an axial thickness equal to an axial thickness of the crank arms, and weighted rough crank arm portions corresponding to weighted crank arms having the balance weights, the weighted rough crank arm portions having an axial thickness greater than an axial thickness of the crank arms, the forming apparatus, comprising:

stationary journal dies disposed at locations corresponding to a location of the third rough journal portion, the stationary journal dies configured to hold and retain the rough journal portion therebetween in the eccentric direction perpendicular to the axial direction, the stationary journal dies configured to be in contact with side surfaces of the rough crank arm portion connecting with the rough journal portion with axial movement thereof restrained, movable journal dies disposed at locations corresponding to locations of the rough journal portions excluding the rough journal portion to be held by the stationary journal dies, the movable journal dies configured to hold and retain the rough journal portions therebetween in the eccentric direction perpendicular to the axial direction, the movable journal dies configured to move axially toward the stationary journal dies while being in contact with side surfaces of corresponding ones of the rough crank arm portions, the corresponding ones of the rough crank arm portions each connecting with a corresponding one of the rough journal portions; and crank pin dies disposed at locations corresponding to locations of the rough crank pin portions, the crank pin dies configured to be brought into contact with the respective rough crank pin portions at inner sides thereof, the crank pin dies configured to move axially toward the stationary journal dies and in the eccentric direction perpendicular to the axial direction while being in contact with side surfaces of corresponding ones of the rough crank arm portions, the corresponding ones of the rough crank arm portions each connecting with a corresponding one of the rough crank pin portions, wherein, in a state where the rough journal portions are held and retained by the stationary journal dies and the movable journal dies and the rough crank pin portions are contacted by the crank pin dies, the movable journal dies are moved axially, and the crank pin dies are moved axially as well as in the eccentric direction, thereby compressing the weighted rough crank arm portions in the axial direction so as to reduce the thickness thereof to the thickness of the weighted crank arms of the forged crankshaft, and pressing the rough crank pin portions in the eccentric direction so as to increase the amount of eccentricity thereof to the amount of eccentricity of the crank pins of the forged crankshaft.

2. The apparatus for forming a blank for finish forging for a forged crankshaft for a 4-cylinder engine according to claim 1, wherein the crank pin dies each include an auxiliary crank pin die disposed at a location facing an outer side, opposite to the inner side, of each rough crank pin portion, the auxiliary crank pin dies configured to move axially, and wherein the movement of the crank pin dies in the eccentric direction is controlled so that the rough crank pin portions to be eccentrically deformed reach the auxiliary crank pin dies after spaces between the stationary journal dies and the movable journal dies and corresponding ones of the crank pin dies and the auxiliary crank pin dies are filled by the axial movement of the movable journal dies as well as the axial movement of the crank pin dies and the auxiliary crank pin dies.

3. The apparatus for forming a blank for finish forging for a forged crankshaft for a 4-cylinder engine according to claim 2, wherein, provided that a total length of movement of the crank pin dies in the eccentric direction is a 100% length of movement thereof, when the axial movement of the movable journal dies that are adjacent to the crank pin dies is completed, a length of movement of the crank pin dies in the eccentric direction is 90% or less of the total length of movement, and thereafter, the movement of the crank pin dies in the eccentric direction is completed.

4. The apparatus for forming a blank for finish forging for a forged crankshaft for a 4-cylinder engine according to claim 1, wherein the stationary journal dies, the movable journal dies, and the crank pin dies are mounted on a press machine that is capable of being moved downward along the eccentric direction, and wherein, by downward movement of the press machine, the stationary journal dies and the movable journal dies are caused to hold and retain the rough journal portions therebetween, and the crank pin dies are brought into contact with the rough crank pin portions; and with continued downward movement of the press machine, the movable journal dies are moved axially by wedge mechanisms, and the crank pin dies are caused to move axially by the movement of the movable journal dies.

5. The apparatus for forming a blank for finish forging for a forged crankshaft for a 4-cylinder engine according to claim 4, wherein the wedge mechanisms have different wedge angles for each of the movable journal dies.

6. The apparatus for forming a blank for finish forging for a forged crankshaft for a 4-cylinder engine according to claim 4, wherein the crank pin dies are coupled to a hydraulic cylinder and caused to move in the eccentric direction by driving the hydraulic cylinder.

7. The apparatus for forming a blank for finish forging for a forged crankshaft for a 4-cylinder engine according to claim 1, in the forged crankshaft, the first, fourth, fifth, and eighth crank arms have balance weights, and the remaining second, third, sixth and seventh crank arm have no balance weights.

8. The apparatus for forming a blank for finish forging for a forged crankshaft for a 4-cylinder engine according to claim 1, in the forged crankshaft, the second, fourth, fifth, and seventh crank arms have balance weights, and the remaining first, third, sixth, and eighth crank arms have no balance weights.

9. A method for manufacturing a forged crankshaft for a 4-cylinder engine, in which fourth and fifth crank arms connecting with a central third journal have balance weights, any one of first and second crank arms connecting with a first crank pin at a fore end has a balance weight, any one of seventh and eighth crank arms connecting with a fourth crank pin at a rear end has a balance weight, and the remaining crank arms have no balance weights,
- the manufacturing method comprising a series of steps, a first preforming step, a second preforming step, and a finish forging step as follows:
- the first preforming step of obtaining the preform blank provided for the forming apparatus according to claim 1;
- the second preforming step of forming a blank for finish forging that has a final shape of the forged crankshaft using the forming apparatus; and
- the finish forging step of subjecting the blank for finish forging to finish forging to form a forged product having the final shape of the forged crankshaft.

* * * * *